(12) United States Patent  (10) Patent No.: US 12,476,369 B2
Salah et al.  (45) Date of Patent: Nov. 18, 2025

(54) NEAR FIELD COMMUNICATION ANTENNA MODULE

(71) Applicant: STRATTEC SECURITY CORPORATION, Milwaukee, WI (US)

(72) Inventors: Abdelmonem Salah, Milwaukee, WI (US); Yi Ming Qu, Milwaukee, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 125 days.

(21) Appl. No.: 18/392,991

(22) Filed: Dec. 21, 2023

(65) Prior Publication Data

US 2025/0210867 A1  Jun. 26, 2025

(51) Int. Cl.
*H01Q 7/00* (2006.01)
*H04B 5/26* (2024.01)
*H04B 5/43* (2024.01)

(52) U.S. Cl.
CPC .............. *H01Q 7/00* (2013.01); *H04B 5/26* (2024.01); *H04B 5/43* (2024.01)

(58) Field of Classification Search
CPC .............. H01Q 7/00; H04B 5/26; H04B 5/43
See application file for complete search history.

(56) References Cited

U.S. PATENT DOCUMENTS

| | | |
|---|---|---|
| 8,498,618 B2 | 7/2013 | Ben Ayed |
| 8,929,814 B2 | 1/2015 | Cheikh |
| 9,045,102 B2 | 6/2015 | Caratto et al. |
| RE46,108 E | 8/2016 | Ohnishi et al. |
| 9,460,570 B2 | 10/2016 | Ieda |
| 9,786,108 B2 | 10/2017 | Spiess et al. |
| 9,858,450 B2 | 1/2018 | Van Bosch et al. |

(Continued)

FOREIGN PATENT DOCUMENTS

| | | |
|---|---|---|
| CN | 203514956 U | 4/2014 |
| CN | 104778768 A | 7/2015 |

(Continued)

OTHER PUBLICATIONS

International Search Report and Written Opinion for Application No. PCT/US2024/055883 dated Jan. 14, 2025 (11 pages).

(Continued)

*Primary Examiner* — Thien M Le
(74) *Attorney, Agent, or Firm* — Michael Best & Friedrich LLP (57) ABSTRACT

A system is provided for secure communication between a vehicle and a portable communication device. The system includes a PaaK transceiver module having an NFC antenna module with a multilayer PCB. The multilayer PCB includes a plurality of PCB layers arranged in a stacking direction. The NFC antenna module also includes an NFC antenna coil. On each respective PCB layer, the NFC antenna coil is wound around the respective PCB layer at or near a peripheral edge of the respective layer. Each winding entirely around the PCB layer forms a turn. The NFC antenna coil extends between adjacent PCB layers of the multilayer PCB through at least one via, and a total number of PCB layers is greater than two.

21 Claims, 6 Drawing Sheets

(56) References Cited

U.S. PATENT DOCUMENTS

| | | |
|---|---|---|
| 9,898,695 B2 | 2/2018 | Suwald |
| 10,027,375 B2 | 7/2018 | Cheikh et al. |
| 10,083,555 B2 | 9/2018 | Woo et al. |
| 10,119,512 B2 | 11/2018 | Kang et al. |
| 10,144,392 B1 | 12/2018 | Cheikh |
| 10,290,165 B2 | 5/2019 | Farges et al. |
| 10,351,099 B2 | 7/2019 | Liubakka et al. |
| 10,362,463 B1 | 7/2019 | Gloss et al. |
| 10,534,819 B2 | 1/2020 | Ricci |
| 10,647,290 B2 | 5/2020 | Spick et al. |
| 10,847,874 B2 | 11/2020 | Park et al. |
| 10,909,785 B2 | 2/2021 | Magner et al. |
| 10,985,593 B2 | 4/2021 | Cheikh |
| 10,985,756 B2 | 4/2021 | Oakes et al. |
| 11,017,621 B1 | 5/2021 | Pukari |
| 11,027,699 B2 | 6/2021 | Golgiri et al. |
| 11,097,689 B2 | 8/2021 | Golsch |
| 11,118,965 B2 | 9/2021 | Rogers et al. |
| 11,265,674 B2 | 3/2022 | Smith et al. |
| 11,269,108 B2 | 3/2022 | Sieg |
| 11,323,155 B2 | 5/2022 | Attaran et al. |
| 11,325,564 B2 | 5/2022 | De Wind et al. |
| 11,465,585 B2 | 10/2022 | Spick et al. |
| 11,613,918 B2 | 3/2023 | Sy et al. |
| 11,630,194 B2 | 4/2023 | Osai et al. |
| 11,741,767 B1 | 8/2023 | Pearson et al. |
| 12,331,561 B2* | 6/2025 | Berels .............. B60R 16/033 |
| 2010/0144269 A1 | 6/2010 | Do et al. |
| 2013/0298208 A1 | 11/2013 | Ayed |
| 2014/0187153 A1 | 7/2014 | Zhu et al. |
| 2015/0333389 A1 | 11/2015 | Orihara et al. |
| 2017/0050615 A1 | 2/2017 | Schindler |
| 2018/0123221 A1 | 5/2018 | Finn et al. |
| 2019/0066422 A1 | 2/2019 | Breer et al. |
| 2019/0204146 A1* | 7/2019 | Wei .............. G01J 1/0209 |
| 2019/0348209 A1 | 11/2019 | Wen et al. |
| 2021/0041874 A1 | 2/2021 | Kim et al. |
| 2021/0094509 A1 | 4/2021 | Graeber et al. |
| 2021/0158639 A1* | 5/2021 | Westra .............. H04L 9/30 |
| 2021/0247540 A1 | 8/2021 | Hourné |
| 2021/0264703 A1 | 8/2021 | Ahmed et al. |
| 2021/0370877 A1 | 12/2021 | Peterson |
| 2022/0024409 A1 | 1/2022 | Becher et al. |
| 2022/0052446 A1 | 2/2022 | Lin |
| 2022/0176897 A1 | 6/2022 | Sieg et al. |
| 2022/0352890 A1 | 11/2022 | Stahl |
| 2023/0066445 A1 | 3/2023 | Sanji et al. |
| 2023/0132590 A1* | 5/2023 | Pandya .............. H05K 1/18 361/752 |
| 2023/0175305 A1 | 6/2023 | Gorenzweig et al. |
| 2023/0258028 A1* | 8/2023 | Berels .............. G07C 9/00174 701/36 |
| 2023/0306806 A1* | 9/2023 | Van Wiemeersch .... G01S 13/56 |
| 2023/0316013 A1 | 10/2023 | Craciun |
| 2023/0359855 A1* | 11/2023 | Zhu .............. G06K 19/02 |
| 2023/0361813 A1* | 11/2023 | Schneider .............. H04B 5/79 |
| 2024/0356253 A1* | 10/2024 | Ensley .............. H01R 13/6587 |
| 2024/0374137 A1* | 11/2024 | He .............. A61B 5/6848 |
| 2024/0395150 A1* | 11/2024 | Sengstaken, Jr. ....... B60R 13/10 |

FOREIGN PATENT DOCUMENTS

| | | |
|---|---|---|
| CN | 204537272 U | 8/2015 |
| CN | 109696869 A | 4/2019 |
| CN | 208915129 U | 5/2019 |
| CN | 210011725 U | 2/2020 |
| CN | 211519453 U | 9/2020 |
| CN | 112233281 A | 1/2021 |
| CN | 214589214 U | 11/2021 |
| CN | 113224506 A | 5/2022 |
| CN | 217086857 U | 7/2022 |
| CN | 116387801 A | 4/2023 |
| CN | 219437209 U | 7/2023 |
| CN | 116527086 A | 8/2023 |
| DE | 102018125176 A1 | 4/2020 |
| DE | 102021126043 A1 | 4/2023 |
| EP | 3503292 A1 | 6/2019 |
| EP | 3503295 A1 | 6/2019 |
| EP | 3981670 A1 | 4/2022 |
| EP | 3602788 B1 | 5/2023 |
| FR | 3013069 A1 | 5/2015 |
| FR | 3058680 A1 | 5/2018 |
| FR | 3075486 A1 | 6/2019 |
| FR | 3075487 A1 | 6/2019 |
| FR | 3106843 A1 | 1/2020 |
| JP | 2012058844 A | 3/2012 |
| JP | 2012060248 A | 3/2012 |
| JP | 2015145578 A | 8/2015 |
| KR | 102347629 B1 | 1/2022 |
| KR | 20220161206 A | 12/2022 |
| WO | 2015177298 A1 | 11/2015 |
| WO | 2020016021 A1 | 1/2020 |
| WO | 2020052923 A1 | 3/2020 |
| WO | 2021094107 A1 | 5/2021 |
| WO | 2021105413 A1 | 6/2021 |
| WO | 2021105416 A1 | 6/2021 |
| WO | 2021156188 A1 | 8/2021 |
| WO | 2021156195 A1 | 8/2021 |
| WO | 2021202958 A1 | 10/2021 |
| WO | 2022069117 A1 | 4/2022 |
| WO | 2022229981 A1 | 11/2022 |
| WO | 2022250508 A1 | 12/2022 |
| WO | 2023020850 A1 | 2/2023 |
| WO | 2023021114 A1 | 2/2023 |
| WO | 2023110501 A1 | 6/2023 |

OTHER PUBLICATIONS

Aexit. "Aexit 40mm (PCB board) x 26mmm FPC-30P SOP30 1mm 0.5mm to DIP30 2.54mm Pitch Interposer PCB Board Adapter Plate (67ry749qf460) Converter 20Pcs" Amazon; Product Listing [online]. Jun. 2020 [Retrieved from the Internet: https://www.amazon.sa/-/en/Aexit-FPC-Interposer-67ry749qf460-Converter/dp/B07DD9KKSG (3 pages).

\* cited by examiner

NEAR FIELD COMMUNICATION ANTENNA MODULE

FIELD

This disclosure is related to Near Field Communication ("NFC") antenna modules, and the use of NFC antenna modules in Phone as a Key ("PaaK") applications.

BACKGROUND

PaaK applications allow users to utilize a mobile device, such as a smart phone, to unlock a vehicle (e.g., without requiring a separate key fob). NFC antenna modules used in current PaaK systems include an NFC antenna coil on a printed circuit board ("PCB"). Sensing distances are often very short, which may be insufficient for many PaaK applications.

SUMMARY

In accordance with one example, a system is provided for secure communication between a vehicle and a portable communication device. The system includes a PaaK transceiver module having an NFC antenna module with a multilayer PCB. The multilayer PCB includes a plurality of PCB layers arranged in a stacking direction. The NFC antenna module also includes an NFC antenna coil. On each respective PCB layer, the NFC antenna coil is wound around the respective PCB layer at or near a peripheral edge of the respective layer. Each winding around the PCB layer forms a turn. The NFC antenna coil extends between adjacent PCB layers of the multilayer PCB through at least one via, and a total number of PCB layers is greater than two.

In accordance with another example, a system is provided for secure communication between a vehicle and a portable communication device. The system includes a PaaK transceiver module having an NFC antenna module with a multilayer PCB. The multilayer PCB includes a plurality of PCB layers arranged in a stacking direction. The NFC antenna module also includes an NFC antenna coil. On each respective PCB layer, the NFC antenna coil is wound around the respective PCB layer at or near a peripheral edge of the respective layer. Each winding around the PCB layer forms a turn. The NFC antenna coil extends between adjacent PCB layers of the multilayer PCB through at least one via, and a total number of turns is greater than four.

In accordance with another example, a system is provided for secure communication between a vehicle and a portable communication device. The system includes a PaaK transceiver module having an NFC antenna module with a multilayer PCB. The multilayer PCB includes a plurality of PCB layers arranged in a stacking direction. The NFC antenna module also includes an NFC antenna coil. On each respective PCB layer, the NFC antenna coil is wound around the respective PCB layer at or near a peripheral edge of the respective layer. Each winding around the PCB layer forms a turn. The NFC antenna coil extends between adjacent PCB layers of the multilayer PCB through at least one via, and along the stacking direction, respective turns of the coil on each respective PCB layer are aligned relative to one another.

DETAILED DESCRIPTION

Before any examples are explained in detail, it is to be understood that the disclosure is not limited in its application to the details of construction and the arrangement of components set forth in the following description or illustrated in the following drawings. The disclosure is capable of other examples and of being practiced or of being carried out in various ways.

Figure 1:
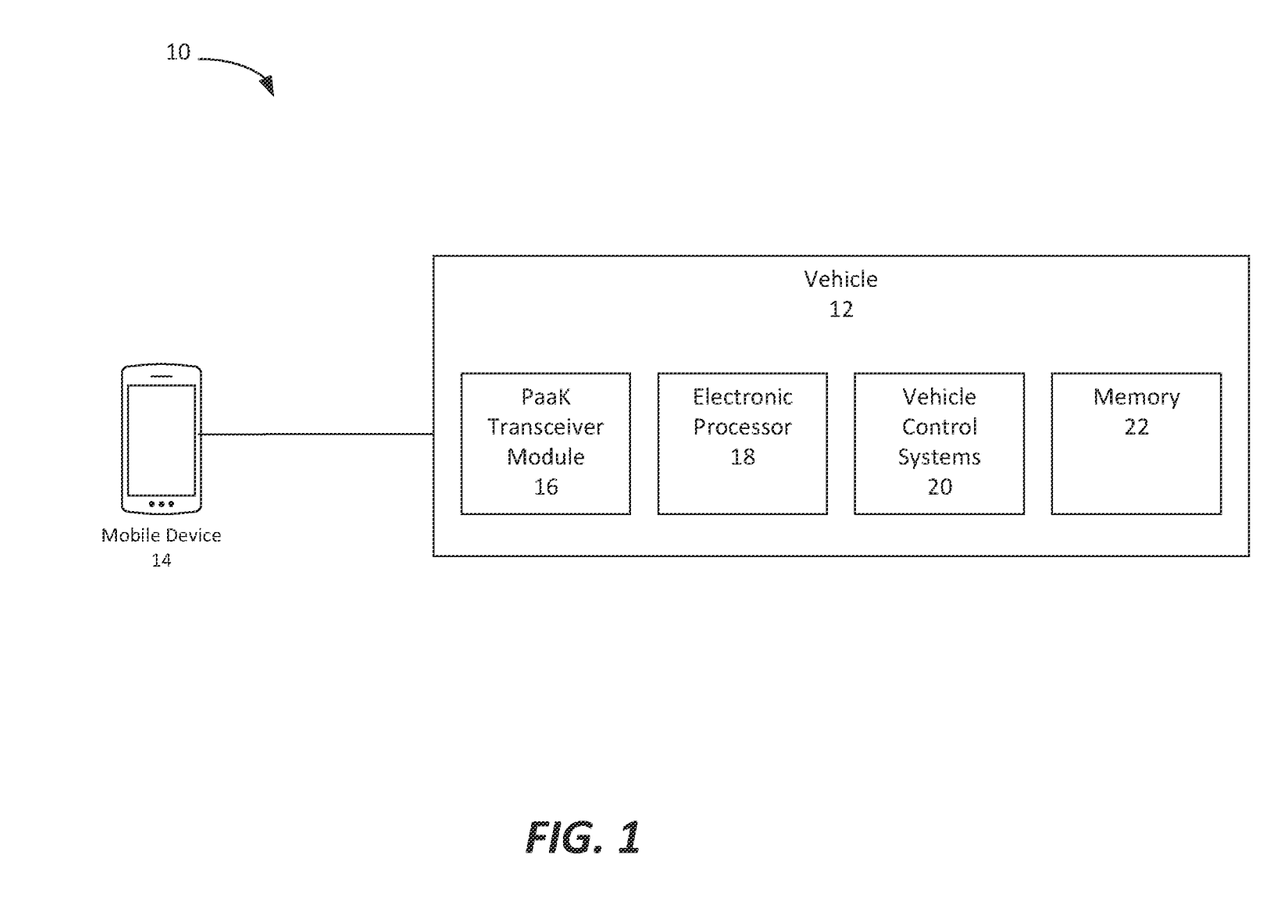
FIG. 1 schematically illustrates a system for secure communication between a vehicle and a portable communication device, according to one example.

With reference to FIG. 1 a system 10 may provide communication between a vehicle 12 and a mobile device 14 such as a phone (otherwise referred to herein as a portable communication device 14). The vehicle 12 includes, for example, a PaaK transceiver module 16, an electronic processor 18, vehicle control systems 20, and/or a memory 22.

The vehicle control systems 20 control operation of the vehicle 12, such as, for example, a motor of the vehicle 12, powertrain components of the vehicle 12, locking and unlocking of doors of the vehicle 12, and/or the like.

The electronic processor 18 is electrically connected to, for example, the PaaK transceiver module 16 and the vehicle control systems 20. The electronic processor 18 may include multiple electronic processors 18 implemented in, for example, a distributed manner in the vehicle 12.

The memory 22 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The memory 22 may store, among other things, authorization codes and encryption data used in determining an authorization of the mobile device 14 to access and/or control the vehicle 12.

The PaaK transceiver module 16 transmits and receives radio frequency signals to and from, for example, the mobile device 14 using one or more antenna according to one or more communication protocols. For example, the PaaK transceiver module 16 may communicate with the mobile device 14 using a cellular network, the Internet, a land mobile radio (LMR) network, a short-range (for example, Bluetooth™) wireless network, a wireless wide area network (WAN), a wireless local area network (for example, Wi-Fi), and/or the like.

The PaaK transceiver module 16, which may include one or more PaaK transceiver modules 16, may include one or more NFC antenna modules 26 disposed at various parts of the vehicle 12. The NFC antenna modules 26 may be arranged for example in a door handle of the vehicle 12, a B-pillar of the vehicle 12, a center console of the vehicle 12, and/or the like as part of a passive entry passive start ("PEPS") system of the vehicle 12.

Figure 2:
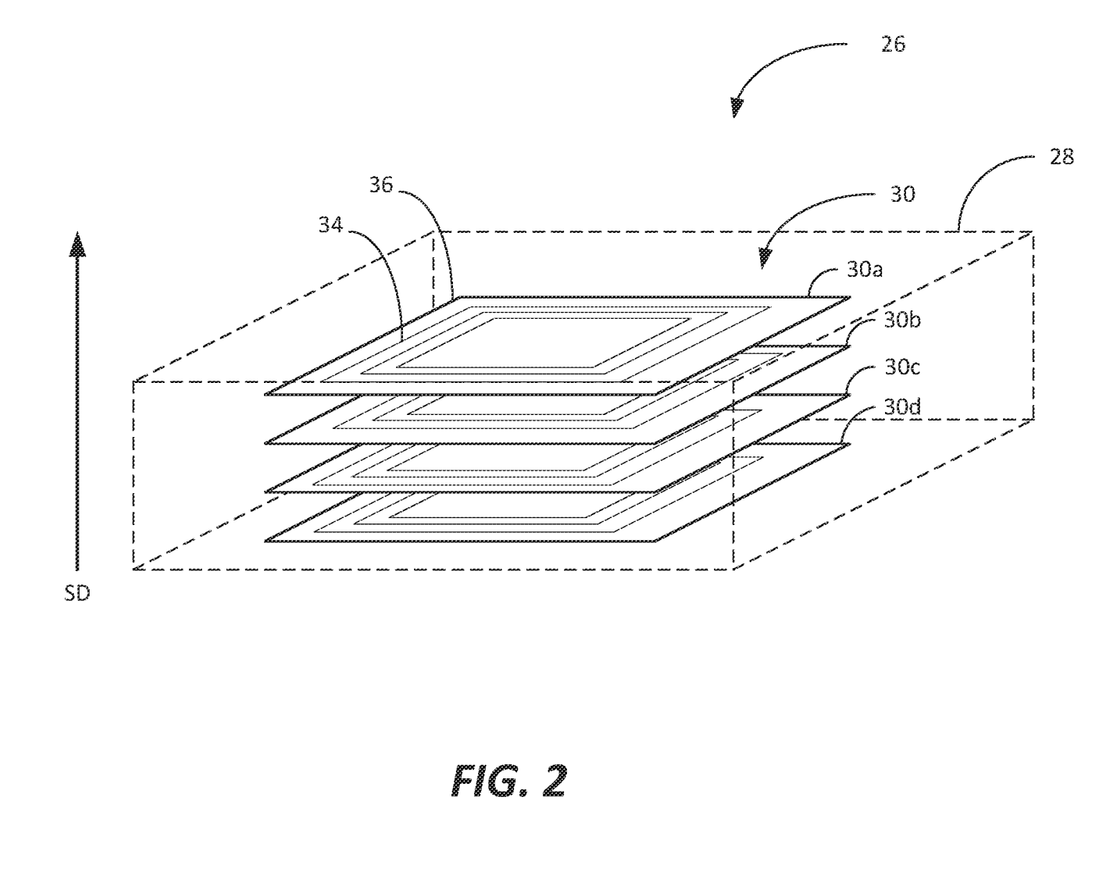
FIG. 2 schematically illustrates an NFC antenna module, according to one example, for use with the system.

The PaaK transceiver module 16 may include, among other things, a circuit (e.g., radiofrequency ("RF") circuit)

having an NFC antenna module 26 configured for coupling (e.g., inductive coupling) with an antenna of the mobile device 14. For example, FIG. 2 illustrates an example of an NFC antenna module 26 that may be included in the PaaK transceiver module 16. The NFC antenna module 26 may include, or be arranged in, a housing 28, although some examples do not include a housing 28. The NFC antenna module 26 includes a multilayer PCB 30. The multilayer PCB 30 includes a plurality of PCB layers (e.g., boards) arranged in a stacking direction SD, and an NFC antenna coil 34. In some examples, the stacking direction SD may extend perpendicular to each of the PCB layers (e.g., to planar surfaces of the PCB layers). In the illustrated example, the PCB has a first PCB layer 30a, a second PCB layer 30b, a third PCB layer 30c, and a fourth PCB layer 30d. In other examples, the multilayer PCB 30 may include more than four PCB layers or less than four PCB layers arranged in the stacking direction SD. For example, the multilayer PCB 30 may include two PCB layers, six PCB layers, eight PCB layers, etc.

The NFC antenna coil 34 is wound around at or near a peripheral edge 36 of each respective PCB layer included in the multilayer PCB 30 (the edges being represented as peripheral edges 36a, 36b, 36c, and 36d in FIGS. 3A-3D). On each PCB layer of the multilayer PCB 30, the NFC antenna coil 34 (or at least a portion thereof) may be arranged at a distance of approximately 0.5 millimeters ("mm"), or between approximately 0.5 and 1.0 mm, or between 0.5 mm and 1.5 mm, from the outer peripheral edge 36. Other examples include other values and ranges of values. In some examples, the NFC antenna coil 34 is arranged at a distance of at least 0.5 mm (e.g., 0.5 mm, 1.0 mm, 1.5 mm, or the like) from the outer peripheral edge 36 of each PCB layer.

Figure 3A:
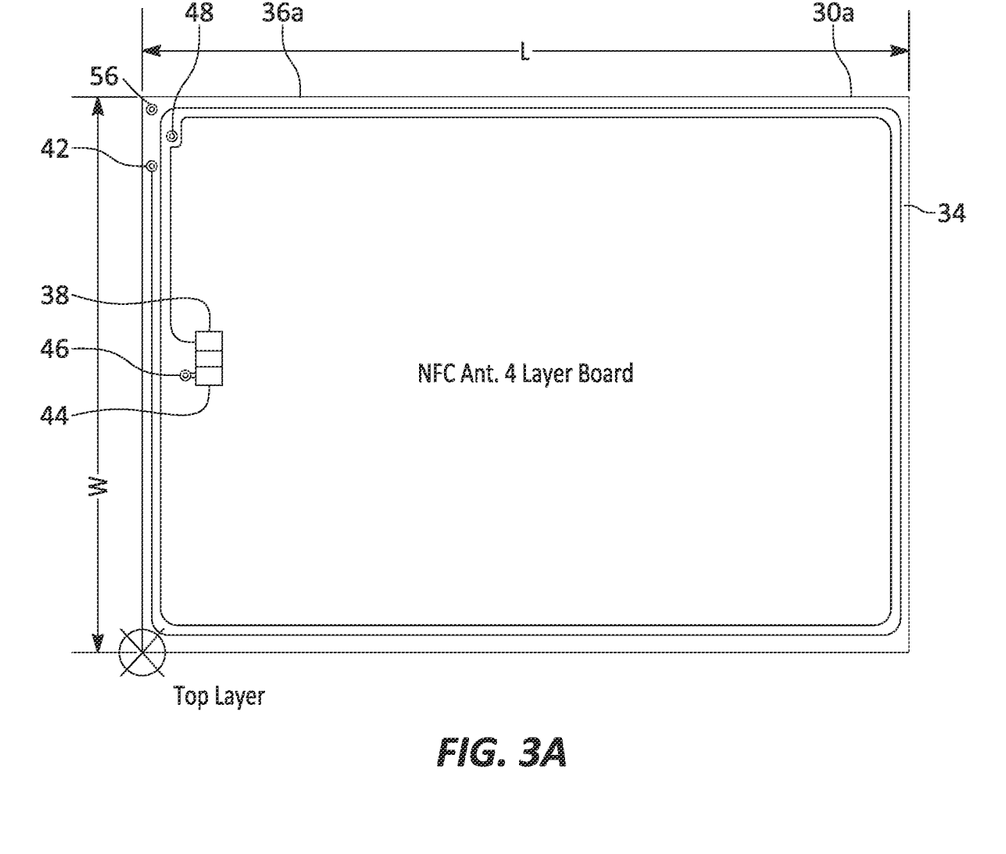
FIG. 3A illustrates a first PCB layer of the NFC antenna module.

Each winding of the NFC antenna coil 34 that extends entirely around the PCB layer forms a "turn" of the NFC antenna coil 34. For example, as seen in FIG. 3A, the NFC antenna coil 34 is wound around the PCB layer at least twice, forming at least two turns on the first PCB layer 30a. In some examples, the antenna coil 34 is wound just once, or is wound three times, or more than three times.

In some examples, the NFC antenna coil 34 is arranged on the multilayer PCB 30 such that segments of the NFC antenna coil 34 on each respective PCB layer are aligned along the stacking direction SD. In other words, in the stacking direction SD, respective turns of the NFC antenna coil 34 may be aligned directly over the top of one another. In other examples, one or more segments of the NFC antenna coil 34 on one of the PCB layers may be offset, and staggered, relative to a corresponding segment or segments of the NFC antenna coil 34 on a different PCB layer, such that respective turns of the NFC antenna coil 34 are not aligned along the stacking direction SD.

While the PCB layers illustrated in FIG. 2 have rectangular shapes, the PCB layers of the multilayer PCB may alternatively have other suitable shapes (square, circular, etc.). Similarly, while in the illustrated example the NFC antenna coil 34 is wound around each PCB layer in a generally rectangular manner at or near the outer peripheral edge 36 of each PCB layer, in other instances, the NFC antenna coil 34 may be wound in other shapes (circular, etc.).

Referring now to FIGS. 3A-3D, on each respective PCB layer of the multilayer PCB 30, the NFC antenna coil 34 extends between adjacent layers of the multilayer PCB 30 through respective vias connecting the adjacent PCB layers of the multilayer PCB 30. For example, FIG. 3A illustrates an example of the first (e.g., top) layer 30a, of a four-layer PCB 30. As illustrated in FIG. 3A, a first segment of the NFC antenna coil 34 is wound around at or near the outer peripheral edge 36a of the first PCB layer 30a between a first signal pad 38 and a first via 42. The first via 42 is arranged in, for example, a first corner of the first PCB layer 30a and extends through at least the first PCB layer 30a to electrically couple the first PCB layer 30a to an adjacent second PCB layer (e.g., the example second PCB layer 30b illustrated in FIG. 3B). However, as illustrated in FIGS. 3A-3D, in some examples, the first via 42 may further couple non-adjacent PCB layers together. For example, in some instances, the first via 42 extends through the first PCB layer 30a and any intervening PCB layers of the multilayer PCB 30 to a bottommost PCB layer, thereby electrically coupling the first PCB layer 30a to the bottommost PCB layer (e.g., the fourth PCB layer 30d illustrated in FIG. 3D). The first via 42 may be located, for example, at a portion of the multilayer PCB 30 exterior to the turns of the NFC antenna coil 34.

The first signal pad 38 may be arranged on a portion of the first PCB layer 30a interior to the turns NFC antenna coil 34. In the illustrated example, the first PCB layer 30a also includes a second signal pad 44 and a second via 46 arranged adjacent to the second signal pad 44 in a direction transverse to the stacking direction SD. Both the second signal pad 44 and the second via 46 may be located at a portion of the first PCB layer 30a interior to the turns of the NFC antenna coil 34. The second via 46 extends through the first PCB layer 30a to a bottommost PCB layer (e.g., the fourth PCB layer 30d), thereby coupling the first PCB layer 30a to the fourth PCB layer 30d. As illustrated in FIGS. 3A and 3D, the second signal pad 44 is electrically connected to a segment of the NFC antenna coil 34 that extends from the fourth PCB layer 30d to the topmost PCB layer 30a through the second via 46 such that a first end of the NFC antenna coil 34 is coupled to the first signal pad 38 and a second end of the NFC antenna coil 34 is coupled to the second signal pad 44. In some examples, additional electronic components (e.g., processors, or the like) are arranged on the first PCB layer 30a at a portion of the first PCB layer 30a interior to the turns of the NFC antenna coil 34. This arrangement of the NFC antenna coil 34 at or near the outer peripheral edge provides for efficient utilization of interior space along the multilayer PCB 30.

Figure 3B:
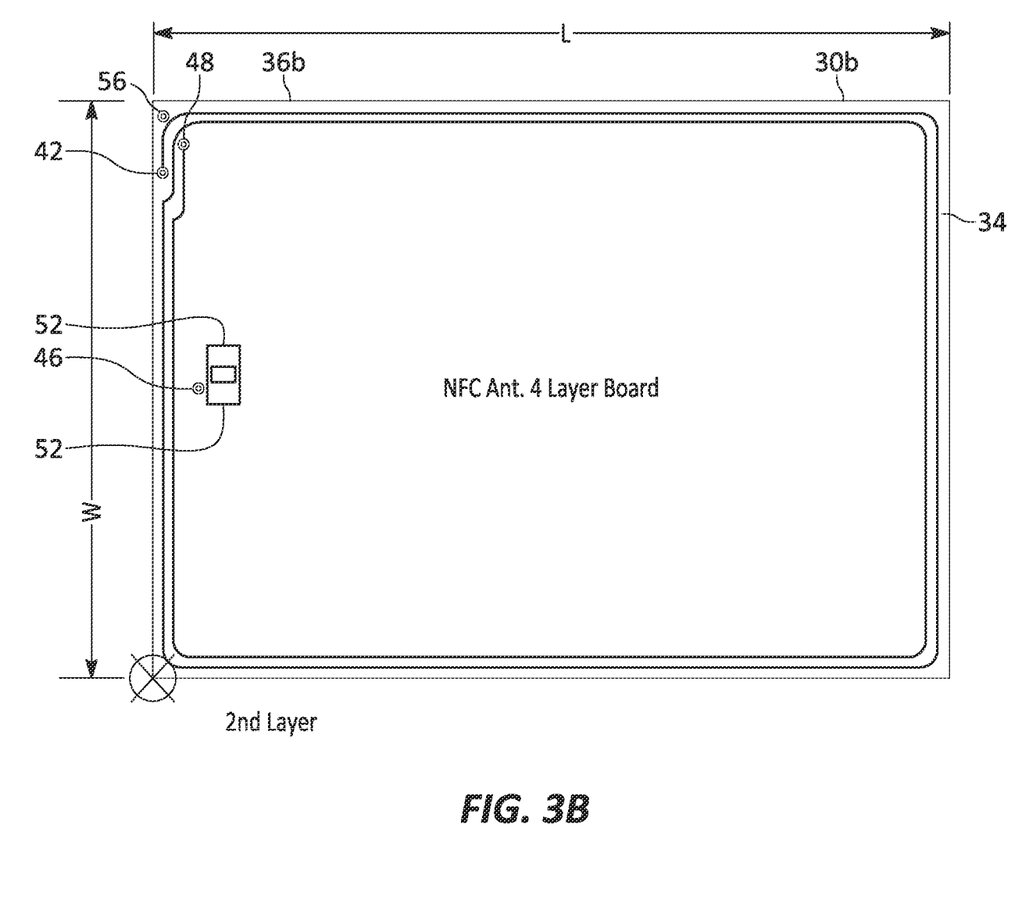
FIG. 3B illustrates a second PCB layer of the NFC antenna module.

FIG. 3B illustrates an example of the second PCB layer 30b that is adjacent to the first PCB layer 30a (e.g., disposed directly underneath the first PCB layer 30a), and the third PCB layer 30c (e.g., disposed directly underneath the second PCB layer 30b) in the stacking direction. As illustrated in FIG. 3B, a second segment of the NFC antenna coil 34 is wound around at or near the outer peripheral edge 36b of the second PCB layer 30b between the first via 42 (i.e., the first via 42 connecting the first PCB layer 30a to at least the second PCB layer 30b) and a third via 48. The third via 48 extends through at least the second PCB layer 30b to electrically couple the second PCB layer 30b to the adjacent third PCB layer 30c. However, in some instances, the third via 48 extends through the first PCB layer 30a and any intervening PCB layers of the multilayer PCB 30 to a bottommost PCB layer, thereby electrically coupling the topmost, first PCB layer 30a to the bottommost PCB layer (e.g., the fourth PCB layer 30d). The third via 48 is located at portion of the multilayer PCB 30 interior to the turns of the NFC antenna coil 34. In some instances, additional electronic components 52 (e.g., signal pads or other electronic components) are arranged on the second PCB layer 30*b* at a portion of the second PCB layer 30*b* interior to the turns of the NFC antenna coil 34.

Figure 3C:
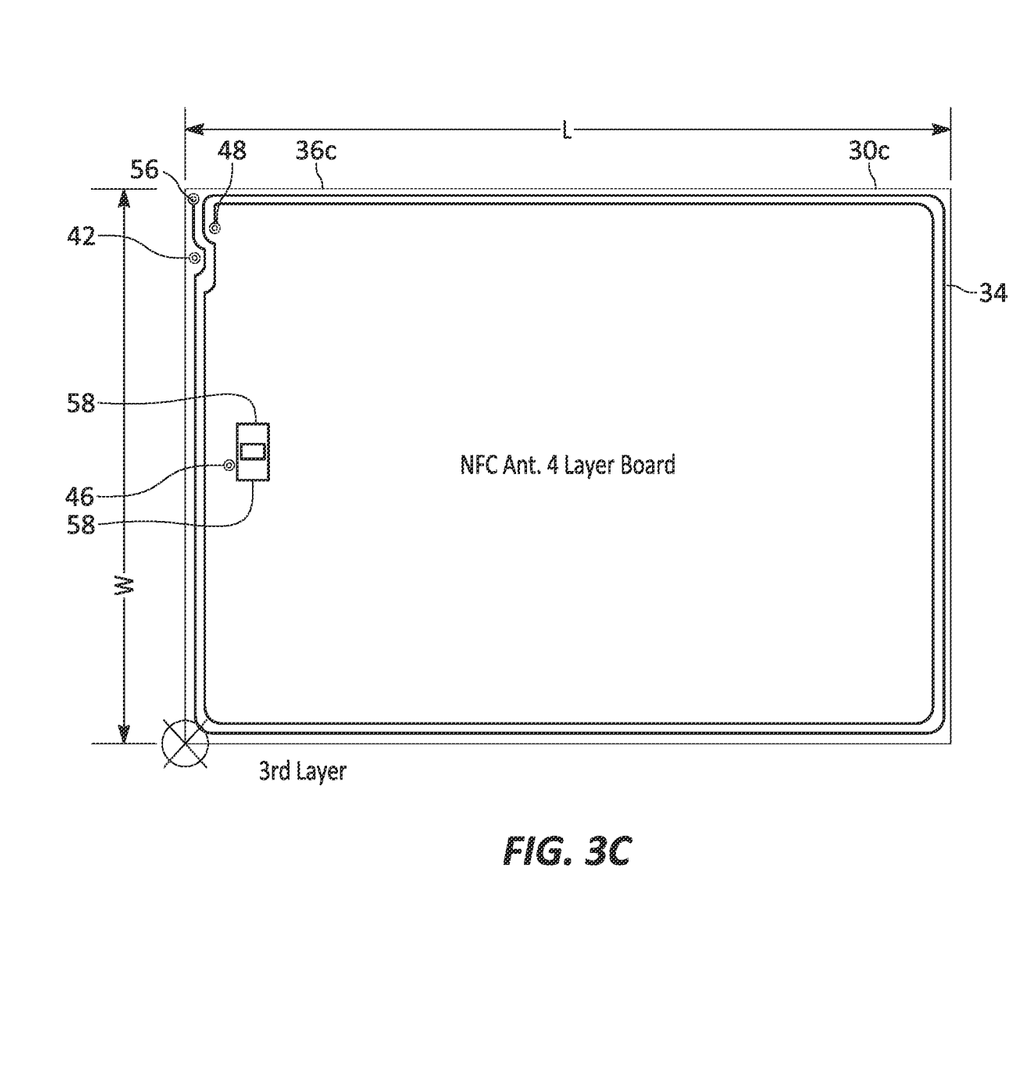
FIG. 3C illustrates a third PCB layer of the NFC antenna module.
Figure 3D:
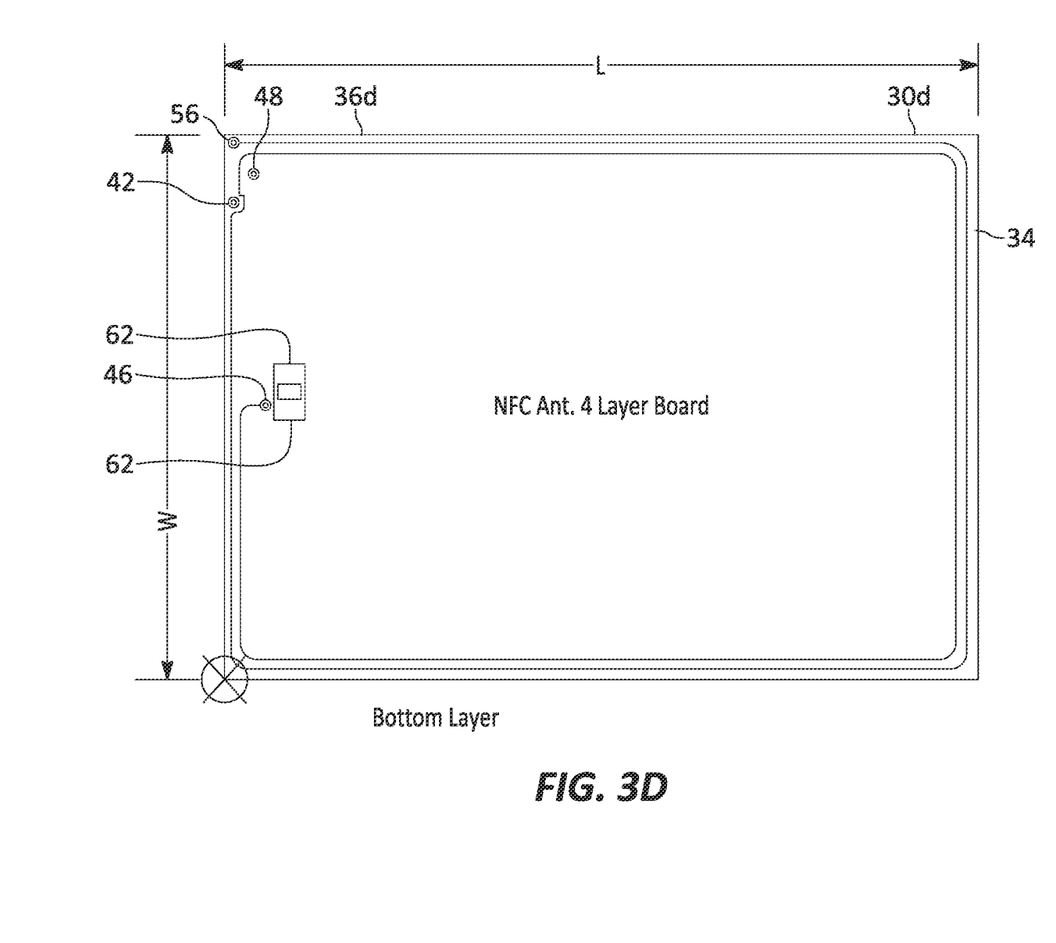
FIG. 3D illustrates a fourth PCB layer of the NFC antenna module.

FIG. 3C illustrates the third PCB layer 30*c* that is adjacent to the second PCB layer 30*b*, and the fourth PCB layer 30*d*, in the stacking direction. As illustrated in FIG. 3C, a third segment of the NFC antenna coil 34 is wound around at or near the outer peripheral edge 36*c* of the third PCB layer 30*c*, between the third via 48 (i.e., the third via 48 connecting the second PCB layer 30*b* to at least the third PCB layer 30*c*) and a fourth via 56. The fourth via 56 extends through at least the third PCB layer 30*c* to electrically couple the third PCB layer 30*c* to the adjacent fourth PCB layer 30*d*. However, in some instances, the fourth via 56 further couples the first PCB layer 30*a* to the fourth PCB layer 30*d*. The fourth via 56 is located at portion of the multilayer PCB 30 exterior to the turns of the NFC antenna coil 34. In some instances, additional electronic components 58 (e.g., signal pads or other electronic components) are arranged on the third PCB layer 30*c* at a portion of the third PCB layer 30*c* interior to the turns of the NFC antenna coil 34.

FIG. 3D illustrates the fourth PCB layer 30*c* that is adjacent to the third PCB layer 30*c* in the stacking direction. In some examples, such as those illustrated in FIGS. 3A-3D, the fourth PCB layer 30*d* is the bottommost PCB layer of the multilayer PCB 30, although the multilayer PCB 30 may include more than four PCB layers, or less than four PCB layers as described above.

As illustrated in FIG. 3D, a fourth segment of the NFC antenna coil 34 is wound around at or near the outer peripheral edge 36*d* of the fourth PCB layer 30*d* between the fourth via 56 (i.e., the fourth via 56 connecting the third PCB layer 30*c* to at least the fourth PCB layer 30*d*) and the second via 46 (i.e. the second via 46 connecting the bottommost PCB layer 30*d* to the topmost PCB layer 30*a*). In some instances, the second via 46 is a plurality of second vias 46 coupling each adjacent pair of PCB layers in the multilayer PCB 30. The fourth via 56 is located at portion of the multilayer PCB 30 exterior to the turns of the NFC antenna coil 34. In some instances, additional electronic components 62 (e.g., signal pads or other electronic components) are arranged on the fourth PCB layer 30*d* at a portion of the fourth PCB layer 30*d* interior to the turns of the NFC antenna coil 34.

The example NFC antenna coil 34 illustrated in FIGS. 3A-3D includes segments forming turns, or windings, for each respective PCB layer of the multilayer PCB 30. In some examples, a segment of the NFC antenna coil 34 on a respective PCB layer of the multilayer PCB 30 may include one turn, two turns, three turns, four turns, or the like. In some instances, the number of turns of each segment of the NFC antenna coil 34 on each respective PCB layer is the same. However, in some instances, the number of turns of each segment of the NFC antenna coil 34 on each respective PCB layer vary.

The total number of turns of the NFC antenna coil 34 is dependent on the number of turns on each respective PCB layer of the multilayer PCB 30 and the total number of PCB layers in the multilayer PCB 30. For example, a multilayer PCB 30 having six PCB layers with two turns of the NFC antenna coil 34 on each respective layer will have a total of twelve turns of the NFC antenna coil 34. In some instances, a total number of turns of the NFC antenna coil 34 ranges between 4 turns and 8 turns, or 4 turns and 12 turns, or 4 turns and 16 turns, or 4 turns and 20 turns, or 4 turns and 24 turns, or 4 turns and 32 turns, or 4 turns and 100 turns, or 2 turns and 100 turns, or other numbers of turns (including greater or less than 4 turns or greater or less than 2 turns).

The number of turns of the NFC antenna coil 34 may impact various operational and physical characteristics of the NFC antenna module 26 such as, for example, a Q factor of the NFC antenna module 26 (i.e., the measure of the bandwidth of the NFC antenna module 26 relative to the center frequency of the bandwidth that NFC antenna module 26 operates in), a sensing distance of the NFC antenna module 26, and/or a size of the NFC antenna module 26. For example, the NFC antenna module 26 may have a sensing distance of at least 35 mm (e.g., 35 mm, 50 mm, 100 mm, etc.) to the mobile device 14 to be authenticated.

Additionally, each of the respective PCB layers of the multilayer PCB 30 is illustrated in FIGS. 3A-3D as having a width dimension W and a length dimension L. In the illustrated example, the width W is 26 mm and the length L is 40 mm. However, the dimensions of the layers of the multilayer PCB 30 are not limited to 26 mm by 40 mm. For example, each layer of the multilayer PCB 30 may have a width W ranging from 20 mm to 30 mm and a length L ranging from 35 mm to 45 mm, or other values and ranges of values. In one example, each PCB layer has a width of 21 mm and a length of 40 mm, with a resulting sensing distance of 50 mm. In yet other examples, the width of one PCB layer may be different than the width W of another PCB layer, and/or the length L of one PCB layer may be different than the length L of another PCB layer.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

Additionally, unless the context of their usage unambiguously indicates otherwise, the articles "a," "an," and "the" should not be interpreted as meaning "one" or "only one."

Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings may illustrate hardware or software located within particular devices, these depictions are for illustrative purposes only. In some examples, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

Various features and advantages of the disclosure are set forth in the following claims.

What is claimed is:

1. A system for secure communication between a vehicle and a portable communication device, the system comprising:
   a phone as a key ("PaaK") transceiver module including
      a near field communication ("NFC") antenna module having a multilayer printed circuit board ("PCB") with a plurality of PCB layers arranged in a stacking direction, and an NFC antenna coil,
      wherein, on each respective PCB layer, the NFC antenna coil is wound around the respective PCB layer at or near a peripheral edge of the respective layer, wherein each winding around the PCB layer forms a turn, wherein the NFC antenna coil extends between adjacent PCB layers of the multilayer PCB through at least one via, and wherein a total number of PCB layers is greater than two;
      wherein a topmost PCB layer of the multilayer PCB includes both a first signal pad and a second signal pad, wherein each of the first signal pad and the second signal pad is arranged on a portion of the topmost PCB layer that is interior to the turns of the NFC antenna coil.

2. The system of claim 1, wherein the multilayer PCB includes between 3 and 8 PCB layers.

3. The system of claim 1, wherein, for each respective PCB layer, the NFC antenna coil includes a plurality of turns around the respective PCB layer.

4. The system of claim 1, wherein a total number of turns of the NFC antenna coil in the plurality of PCB layers is between 2 turns and 100 turns.

5. The system of claim 1, wherein the NFC antenna coil is wound at a distance of at least 0.5 millimeters ("mm") from the peripheral edge of each respective PCB layer.

6. The system of claim 5, wherein the NFC antenna coil is wound at a distance between 0.5 mm and 1.0 mm from the peripheral edge of each respective PCB layer.

7. The system of claim 5, wherein the NFC antenna coil is wound at a distance between 0.5 mm and 1.5 mm from the peripheral edge of each respective PCB layer.

8. The system of claim 1, wherein a sensing distance of the NFC antenna coil is at least 35 mm.

9. The system of claim 8, wherein a sensing distance of the NFC antenna coil is at least 50 millimeters.

10. The system of claim 1, wherein a number of turns of the NFC antenna coil on a first respective PCB layer is different from a number of turns of the NFC antenna coil on a second respective PCB layer.

11. The system of claim 1, wherein a number of turns of the NFC antenna coil on each respective PCB layer is the same.

12. The system of claim 1, wherein the at least one via includes a plurality of vias each coupling adjacent PCB layers.

13. The system of claim 1, wherein
   a first end of the NFC antenna coil is coupled to the first signal pad, and
   a second end of the NFC antenna coil is coupled to the second signal pad.

14. The system of claim 13, wherein the NFC antenna coil extends from the topmost PCB layer to a bottommost PCB layer through one of the vias.

15. The system of claim 1, wherein on at least one respective PCB layer, the at least one via includes a first via and a second via each coupling the respective PCB layer to an adjacent PCB layer, wherein the first via is located at portion of the respective PCB layer exterior to the turns of the NFC antenna coil, and the second via is located at a portion of the respective PCB layer interior to the turns of the NFC antenna coil.

16. The system of claim 1, wherein each respective PCB layer has a width of 26 mm and a length of 40 mm.

17. The system of claim 1, wherein along the stacking direction, respective turns of the coil on each respective PCB layer are aligned relative to one another.

18. The system of claim 1, wherein each turn of the NFC antenna coil is a wound, rectangular shape.

19. The system of claim 1, wherein the multilayer PCB further includes a plurality of electronic components arranged interior to the turns of the NFC antenna coil on at least one PCB layer of the multilayer PCB.

20. A system for secure communication between a vehicle and a portable communication device, the system comprising:
   a PaaK transceiver module including
      a near field communication ("NFC") antenna module having a multilayer PCB with a plurality of PCB layers arranged in a stacking direction, and an NFC antenna coil,
      wherein, on each respective PCB layer, the NFC antenna coil is wound around the respective PCB layer at or near a peripheral edge of the respective layer, wherein each winding around the PCB layer forms a turn, wherein the NFC antenna coil extends between adjacent PCB layers of the multilayer PCB through at least one via, and wherein a total number of turns is greater than four;
      wherein a topmost PCB layer of the multilayer PCB includes both a first signal pad and a second signal pad, wherein each of the first signal pad and the second signal pad is arranged on a portion of the topmost PCB layer that is interior to the turns of the NFC antenna coil.

21. A system for secure communication between a vehicle and a portable communication device, the system comprising:
 a phone as a key ("PaaK") transceiver module including
  a near field communication ("NFC") antenna module having a multilayer printed circuit board ("PCB") with a plurality of PCB layers arranged in a stacking direction, and an NFC antenna coil,
  wherein, on each respective PCB layer, the NFC antenna coil is wound around the respective PCB layer at or near a peripheral edge of the respective layer, wherein each winding around the PCB layer forms a turn, wherein the NFC antenna coil extends between adjacent PCB layers of the multilayer PCB through at least one via, and wherein along the stacking direction, respective turns of the coil on each respective PCB layer are aligned relative to one another;
  wherein a topmost PCB layer of the multilayer PCB includes both a first signal pad and a second signal pad, wherein each of the first signal pad and the second signal pad is arranged on a portion of the topmost PCB layer that is interior to the turns of the NFC antenna coil.

\* \* \* \* \*